(12) United States Patent
Fuson

(10) Patent No.: US 7,262,385 B2
(45) Date of Patent: Aug. 28, 2007

(54) MATERIAL PROCESSING DEVICE

(75) Inventor: Phillip L. Fuson, League City, TX (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 10/707,958

(22) Filed: Jan. 28, 2004

(65) Prior Publication Data

US 2005/0161446 A1 Jul. 28, 2005

(51) Int. Cl.
*B23K 26/00* (2006.01)
*B23K 26/02* (2006.01)

(52) U.S. Cl. .............................. 219/121.6; 219/121.76; 219/121.77; 219/161

(58) Field of Classification Search ..............................
219/121.63–121.72, 121.76, 121.77, 121.86, 219/161
See application file for complete search history.

(56) References Cited

U.S. PATENT DOCUMENTS

| | | | | |
|---|---|---|---|---|
| 3,622,743 | A | * | 11/1971 | Muncheryan .......... 219/121.63 |
| 3,668,359 | A | * | 6/1972 | Emmerson ................ 219/60 A |
| 3,939,563 | A | * | 2/1976 | Deike .......................... 30/361 |
| 3,960,064 | A | * | 6/1976 | Straitz et al. ................... 454/1 |
| 4,080,525 | A | * | 3/1978 | Gobetz ................. 219/121.63 |
| 4,339,116 | A | * | 7/1982 | Benz et al. ................. 269/132 |
| 4,379,215 | A | * | 4/1983 | Rohrberg ................... 219/60 A |
| 4,380,941 | A | * | 4/1983 | Petersen .................... 81/180.1 |
| 4,689,467 | A | * | 8/1987 | Inoue ...................... 219/121.6 |
| 4,843,209 | A | * | 6/1989 | Milligan ................ 219/121.63 |
| 4,953,292 | A | * | 9/1990 | Tobey ............................ 30/97 |
| 4,959,521 | A | * | 9/1990 | Maruyama et al. .... 219/121.63 |
| 4,968,892 | A | * | 11/1990 | McAtee ................... 250/458.1 |
| 5,008,510 | A | * | 4/1991 | Koseki ..................... 219/121.7 |
| 5,076,121 | A | * | 12/1991 | Fosella ....................... 81/58.4 |
| 5,496,983 | A | * | 3/1996 | Hoshi ...................... 219/69.17 |

(Continued)

FOREIGN PATENT DOCUMENTS

JP      356047756 A  *  4/1981

(Continued)

OTHER PUBLICATIONS

Thefabricator.com, *Space-age Welding,the past, present and future of aerospace join processes*, B.E. Paton, Apr. 10, 2003 (p. 1-4).

(Continued)

*Primary Examiner*—Samuel M. Heinrich
(74) *Attorney, Agent, or Firm*—Matthew W. Witsil; Charles L. Moore; Moore & Van Allen, PLLC

(57) ABSTRACT

A device for material processing, such as welding, joining, cutting, inspecting and the like, includes an energy beam source and one or more energy beam transfer devices. The one or more transfer devices may direct an energy beam at one or more predetermined locations on a workpiece. In one embodiment of the present invention, the transfer device may be rotated around or moved relative to the workpiece on a movable frame. In another embodiment of the present invention, an inspection device may be moved or rotated around a workpiece on a movable frame. A further material processing device may include a material processing system directed along a predetermined path. The material processing device may also include an inspection system adapted to move along the predetermined path.

18 Claims, 10 Drawing Sheets

U.S. PATENT DOCUMENTS

| | | | |
|---|---|---|---|
| 5,729,147 A * | 3/1998 | Schaff | 324/755 |
| 5,841,089 A * | 11/1998 | Martinenas | 219/60 A |
| 5,869,801 A * | 2/1999 | Paton et al. | 219/121.12 |
| 5,929,765 A * | 7/1999 | Urech et al. | 340/674 |
| 5,998,097 A * | 12/1999 | Hatakeyama et al. | 430/296 |
| 6,380,505 B1 * | 4/2002 | Stoops et al. | 219/60 A |
| 6,513,555 B1 * | 2/2003 | Lesser et al. | 140/123.6 |
| 6,770,844 B2 * | 8/2004 | Morita | 219/121.77 |
| 6,918,905 B2 * | 7/2005 | Neuberger | 606/9 |
| 2003/0029040 A1 * | 2/2003 | Cesaroni et al. | 29/890.046 |

FOREIGN PATENT DOCUMENTS

| | | | |
|---|---|---|---|
| JP | 408300180 A | * | 11/1996 |
| JP | 409314362 A | * | 12/1997 |
| JP | 02000102886 A | * | 4/2000 |

OTHER PUBLICATIONS

Space Transportation, News Release NASA Marshall Space Flight Center, *NEXT Workshop Explores Space Manufacturing*, Aug. 8, 2003 (p. 1-2).

Moving Energy © Newsletter, Anionics, Inc., *Electron Beam Welding High Tech Solutions for Everyday Manufacturing Needs*, vol. 2, Issue 1, Spring, 1998 (p. 1-2).

94-196 NASA Signs Contract with Ukraine to Sly Space Welding Tool, Dianne Hill, Nov. 23, 2994, (p. 1-2).

* cited by examiner

MATERIAL PROCESSING DEVICE

BACKGROUND OF INVENTION

This invention relates to the field of material processing, such as welding, joining, cutting, inspection and the like, and more particularly to a material processing device and method.

Material processing operations, such as welding, joining, cutting, inspection, or similar operations in some environments, such as outer space, can be very difficult and require a high level of skill and training. Additionally, equipment or devices for such operations may not be easily portable and may be cumbersome and awkward to use, particularly if the user is wearing special equipment such as a space suit or the like. Further, an energy beam for cutting or welding or other emissions from material processing operations can present hazards, particularly in outer space applications.

Reliability and continued operational performance are also major factors for current and future manned space vehicles and habitats. Specifically, facilities such as the International Space Station (ISS) and space vehicles such as the Space Shuttle lack equipment suitable for fabrication, repair, and inspection operations that meet desired safety, usability and reliability constraints. Thermal control, operational, and life support fluid line systems, for example, call for equipment with zero-leak repair and nondestructive inspection capabilities. Additionally, the ISS includes exterior surfaces referred to as ISO grid skins. An ISO grid skin has a surface that has a grid of ribs, or ridges, with recessed areas between the ribs. An impact to the skin could produce a structurally weakened area, generate a hole, or create a stress crack between the ISO grid ribs and result in loss of an operational segment of the ISS unless the ISO grid can be safely and reliably repaired and inspected in space. Further, quick disconnect fittings or flexible lines may also need to be safely and reliably removed and replaced on the ISS, and spot repairs to exterior fluid lines or other repairs may need to be performed safely and reliably, as well as inspection of such repairs.

SUMMARY OF INVENTION

In accordance with an embodiment of the present invention, a device to process material includes an energy beam source to generate an energy beam and at least one energy beam transfer device. The energy beam transfer device is operatively connectable to the energy beam source and is disposable relative to a workpiece. The energy beam transfer devices direct the energy beam in a predetermined pattern on an exterior surface of the workpiece. Accordingly, the present invention may be used to automatically perform precise material processing operations reliably without a high level of skill or training and in an environment such as outer space or the like.

In accordance with another embodiment of the present invention, a device to process material includes a housing to substantially enclose at least a portion of a workpiece to be processed. The device also includes an energy beam source to generate an energy beam, and means to direct the energy beam on at least one predetermined location on the portion of the workpiece enclosed within the housing. The present invention may also be used to safely and automatically perform precise, reliable material processing operations by containing the energy beam and any debris within the housing.

In accordance with another embodiment of the present invention, a device to inspect a workpiece includes a movable frame, a laser holographic exciter mounted to the movable frame, and at least one laser reader mounted to the movable frame. The movable frame is adapted to be movable relative to the workpiece during an inspection process. Accordingly, the present invention may also be used to automatically inspect repairs to a workpiece without a high level of skill or training and in an environment such as outer space or the like.

In accordance with another embodiment of the present invention, a device to process material includes a base member, a track, and a material processing system. The base member may be adapted to releasably hold a portion of material to be attached to a workpiece. The track is mounted to the base member. The material processing system is adapted to move along the track to perform a material processing operation. The track may be formed to correspond with the shape of an ISO grid of the ISS or to define any predetermined path. Accordingly, the present invention may be used to repair an ISO grid on the ISS or to perform material processing operations on other types of aerospace vehicles or workpieces.

In accordance with another embodiment of the present invention, a device to process material includes a base member. A first track is mounted to the base member. A carriage includes a bottom portion and a top portion, with the bottom portion being adapted to move along the first track. A second track is slidably mounted on the top portion of the carriage. A material processing system is mounted to the second track to perform a material processing operation on a workpiece.

In accordance with another embodiment of the present invention, a device to inspect a workpiece includes a base member and a track mounted to the base member. An inspection system is adapted to move along the track to perform an inspection operation on a workpiece. The track may be formed to correspond with the shape of an ISO grid of the ISS or to define any predetermined path. Accordingly, the present invention may be used to inspect an ISO grid on the ISS or to perform inspection operations on other types of aerospace vehicles or workpieces.

In accordance with another embodiment of the present invention, a method of making a device to process material includes providing an energy beam source to generate an energy beam. The method further includes disposing at least one energy beam transfer device to direct the energy beam in a predetermined pattern on an exterior surface of a workpiece. The at least one energy beam transfer device is operatively connected to the energy beam source.

In accordance with another embodiment of the present invention, a method of making a device to inspect a workpiece includes providing a movable frame adapted to move relative to the workpiece. The method further includes mounting a laser holographic exciter and at least one laser reader to the movable frame.

In accordance with another embodiment of the present invention, a method of making a device to process material includes providing a base member. A track is mounted to the base member. A material processing system is provided that is adapted to move along the track to perform a material processing operation on a workpiece.

In accordance with another embodiment of the present invention, a method of processing material includes generating an energy beam and directing the energy beam in a predetermined pattern on a workpiece through at least one energy beam transfer device.

In accordance with another embodiment of the present invention, a method of inspecting a workpiece includes projecting a laser holographic pattern on the workpiece. The laser holographic pattern is moved around a portion of the workpiece to be inspected. Defects in the workpiece are detected by observing the laser holographic pattern.

In accordance with another embodiment of the present invention, a method of processing material includes moving a material processing system along a predetermined path to perform a material processing operation. The method may also include moving an inspection system along the predetermined path to perform an inspection operation. The material processing system may be moved simultaneously with the inspection system, such that an inspection operation may be performed after the material processing operation for efficiency.

The features, functions, and advantages can be achieved independently in various embodiments of the present invention or may be combined in yet other embodiments.

DETAILED DESCRIPTION

Figure 1:
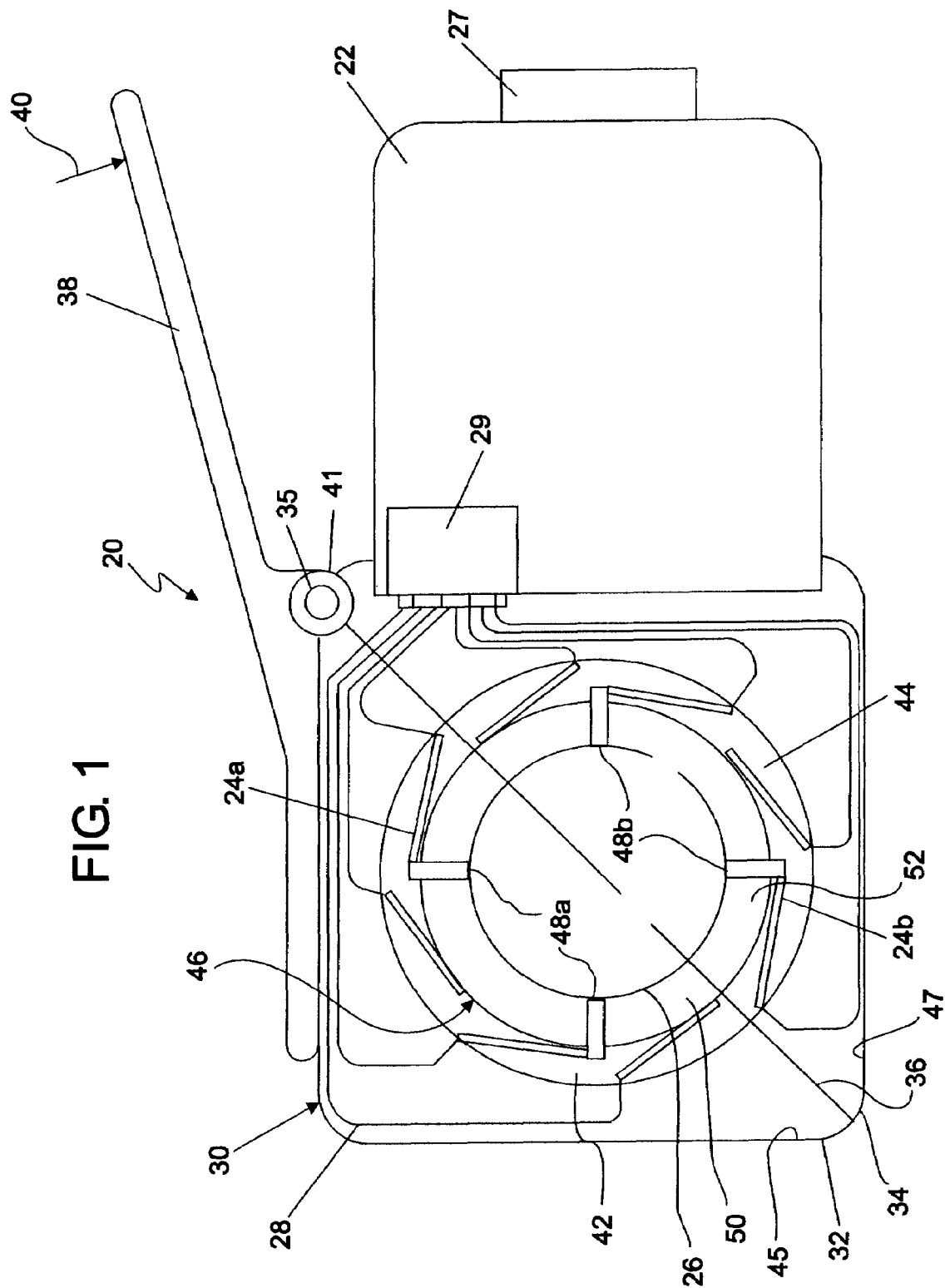
FIG. 1 is a section view of a material processing device in accordance with an embodiment of the present invention.

The following detailed description of preferred embodiments refers to the accompanying drawings that illustrate specific embodiments of the invention. Other embodiments having different structures and operations do not depart from the scope of the present invention.

In the Figures herein, unique features receive unique reference numerals, while features that are the same in more than one drawing receive the same reference numerals throughout. The scope of the invention is not intended to be limited by materials listed herein, but may be carried out using any materials that allow the construction and operation of the present invention. Materials and dimensions depend on the particular application.

Figure 2:
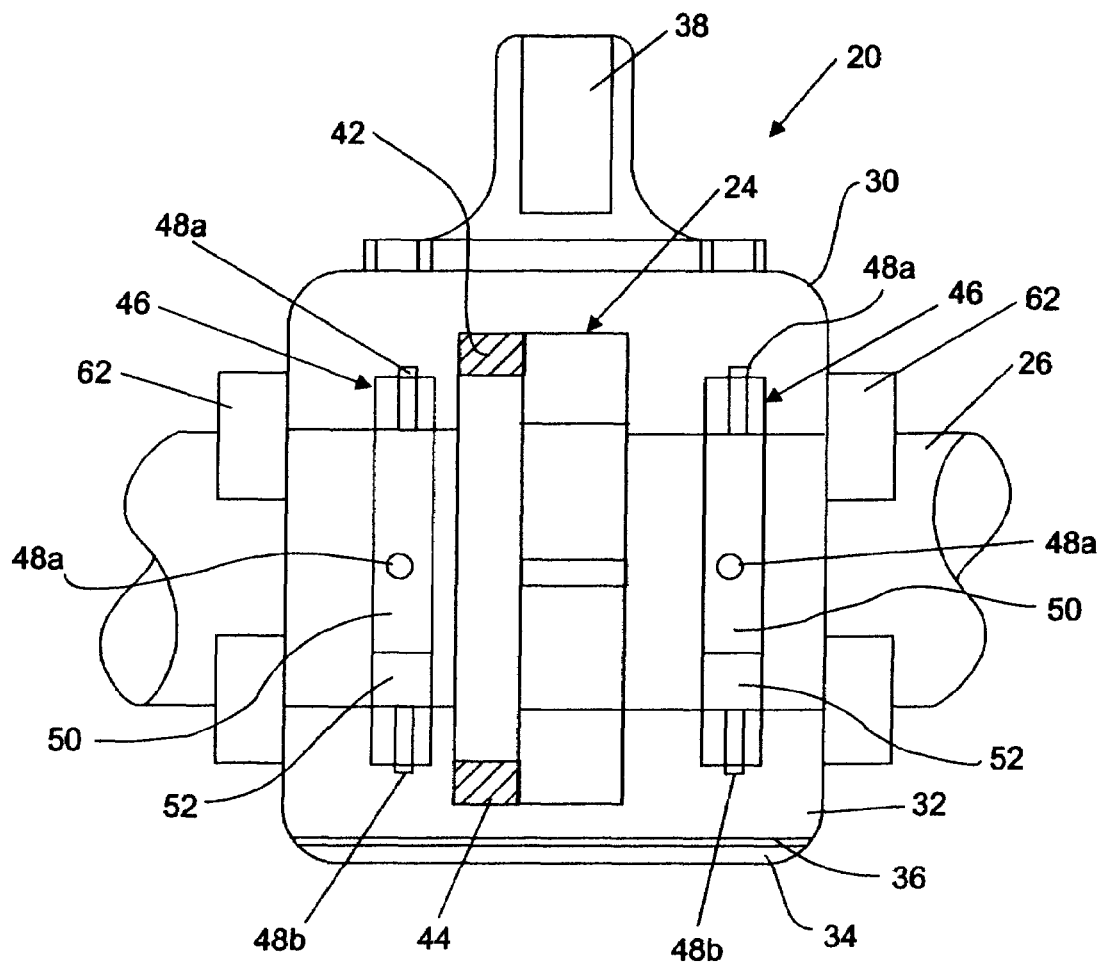
FIG. 2 is a cut-away front elevation view of the material processing device of FIG. 1.

Referring to the drawings, FIG. 1 is a section view of a material processing device 20 to process material and FIG. 2 is a cut-away front view of the same device 20. Processing material may include welding, joining, cutting, inspecting, or the like. The device 20 may include an energy beam source 22 to generate an energy beam, and at least one energy beam transfer device 24 disposable relative to a workpiece 26. The workpiece 26 shown in FIG. 1 is a tube, but the device 20 may be adapted to perform material processing on other types and shapes of workpieces. A plurality of energy beam transfer devices 24 may be included. Each of the energy beam transfer devices 24 may be operatively connectable to the energy beam source 22 by a suitable connector 28, such as a fiber optic cable or the like. The energy beam transfer devices 24 may direct the energy beam in a predetermined pattern on an exterior surface of the workpiece 26. In the example shown in FIG. 1, the energy beam transfer devices 24 may direct the energy beam substantially completely around the exterior surface of the workpiece 26. A receptacle 27 or the like may be provided to connect electrical power to the energy beam source 22. The energy beam may be directed to each of the transfer devices 24 by a switching device 29. The switching device 29 may be an optical switch or similar device. The energy beam source 22 may be an electron beam system, laser material processing system or the like. Each energy beam transfer device 24 may be a lens or similar energy or light focusing device. Eight lenses are shown in this example embodiment.

Each energy beam transfer device 24 may be angled to allow its energy beam to overlap with the energy beam from transfer devices 24 on each side. The energy beam transfer angle, width of beam, and distance of the energy beam transfer devices 24 from the workpiece surface may determine the correct depth of field ratio to overlap to provide a continuous coverage of the workpiece 26. The operational change for uses such as welding, joining, and cutting may be made by varying intensity of the energy beam or amperage of the electron beam. During operation there are typically no moving parts.

The device 20 may also include a housing 30, which may be formed in a first part 32 and a second part 34. The housing 30 encloses the energy beam and at least a portion of the workpiece 26, as best shown in FIG. 2. The parts 32 and 34 may be coupled together by a hinge arrangement 35 (FIG. 1) or the like to permit the parts 32 and 34 to pivotably move relative to one another and to releasably enclose that portion of the workpiece 26. The parts 32 and 34 may join at a junction 36 to form the housing 30. A lever 38 may be provided to open the housing 30 to admit and release the workpiece 26 when a force illustrated by arrow 40 in FIG. 1 is applied to the lever 38. The lever 38 may be spring loaded by a biasing mechanism 41 to return the housing 30 to the closed position when force 40 is not applied. The biasing mechanism 41 may be a spring associated with the hinge arrangement 35 to clamp the first and second parts 32 and 34 around the workpiece 26 during a material processing operation. The housing 30 may thus form a seal around the workpiece 26 to retain the energy beam and any debris within the housing 30 during a material processing operation.

The device 20 may include a first transfer device support 42 and a second transfer device support 44. The first transfer device support 42 may be coupled to an interior 45 of the first part 32 of the housing 30 and the second transfer device support 44 may be coupled to an interior 47 of the second part of the housing 30. A first group 24a of energy transfer devices 24 may be supported by the first transfer device 42 and a second group 24b of energy transfer devices 24 may be supported by the second transfer device 44. The transfer device supports 42 and 44 may extend around the workpiece 26 in order to distribute the transfer devices 24 accordingly. The transfer device supports 42 and 44 may combine, for example, to form substantially a ring around the workpiece 26, as shown in FIGS. 1 and 2, when the first and second parts 32 and 34 are biased together.

A pair of workpiece fixtures 46 may retain the workpiece 26 in position relative to the transfer devices 24 or lenses. Each workpiece fixture 46 may include a plurality of centering pins 48 disposed in a predetermined distribution about the workpiece 26 to hold the workpiece 26 in position. Each workpiece fixture 46 may also include a first pin support 50 and a second pin support 52. The first pin support 50 may be coupled to the interior 45 of the first part 32 of the housing 30 to support a first group of pins 48a of the plurality of pins 48. The second pin support 52 may be coupled to the interior 47 of the second part 34 of the housing 30 to support a second group of pins 48b of the plurality of pins 48.

Figure 3:
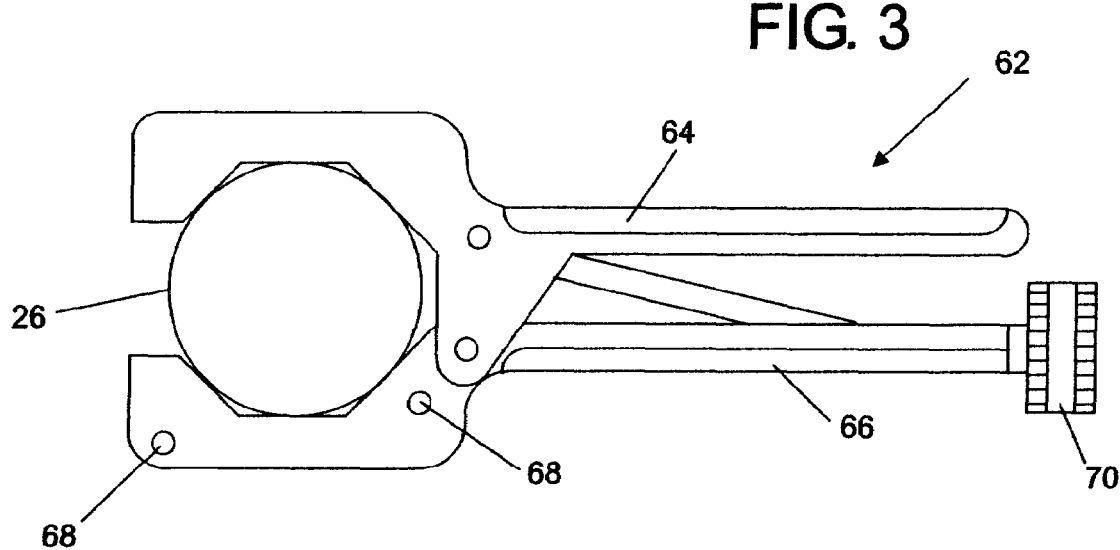
FIG. 3 is a side elevation view of a tool positioner for use with the material processing device of FIG. 1.

The device 20 may further comprise one or more tool positioners 62 as shown in FIGS. 2 and 3. A tool positioner 62 may include a first operating lever 64 and a second operating lever 66. The second operating lever 66 may be attached to one part of the housing 30 with fasteners through openings 68 in the second operating lever 66. The first operating lever 64 and second operating lever 66 are pivotally coupled to permit the first part of the housing 32 and the second part of the housing 34 to open to receive the workpiece 26, to hold the workpiece 26 during a material processing operation, and to subsequently release the workpiece 26. A rotating caliper adjustment 70 may be provided to gradually tighten the tool positioner 62 around the workpiece 26 and to precisely control the amount of force applied to the workpiece 26 by the tool positioner 62.

The workpiece 26 may include, for example, a tube, and may be located on an aerospace vehicle or the workpiece 26 may be a component on another type vehicle or apparatus. The device 20 may be adapted to operate in substantially a vacuum, in zero gravity, or in other environments.

Figure 4:
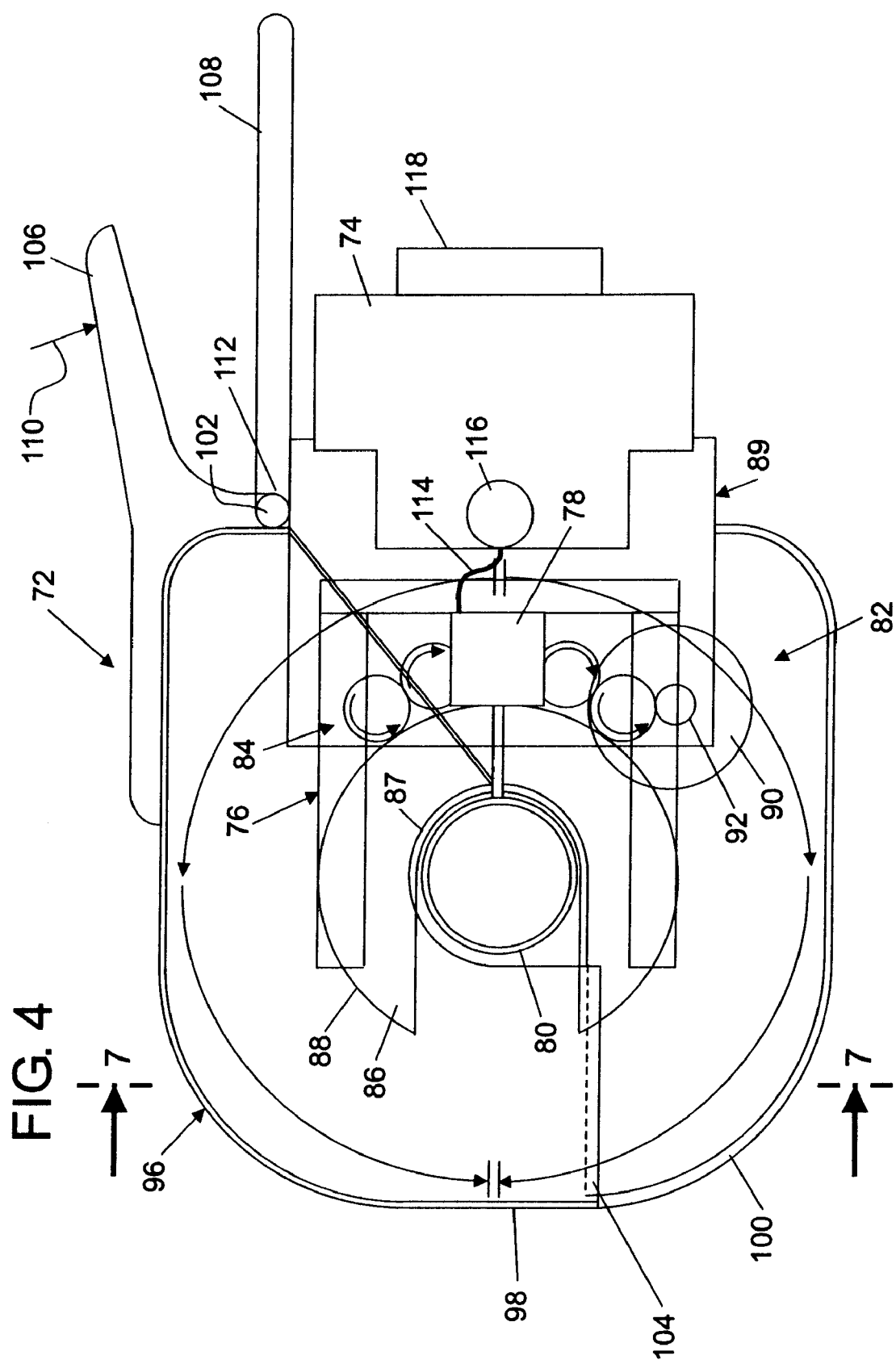
FIG. 4 is a section view of a material processing device in accordance with another embodiment of the present invention.

FIGS. 4-7 illustrate a material processing device 72 in accordance with another embodiment of the present invention. FIG. 4 is a section view of the material processing device 72. The device 72 includes an energy beam source 74, a movable frame 76, and an energy beam transfer device 78. The energy beam transfer device 78 is mounted to the movable frame 76. The energy beam transfer device 78 may be operatively connectable to the energy beam source 74 and direct the energy beam on at least one predetermined location on a workpiece 80. The energy beam source 74 may be an electron beam system, laser material processing system, or the like. The energy beam transfer device 78 may be a lens or similar energy or light focusing device.

Figure 5:
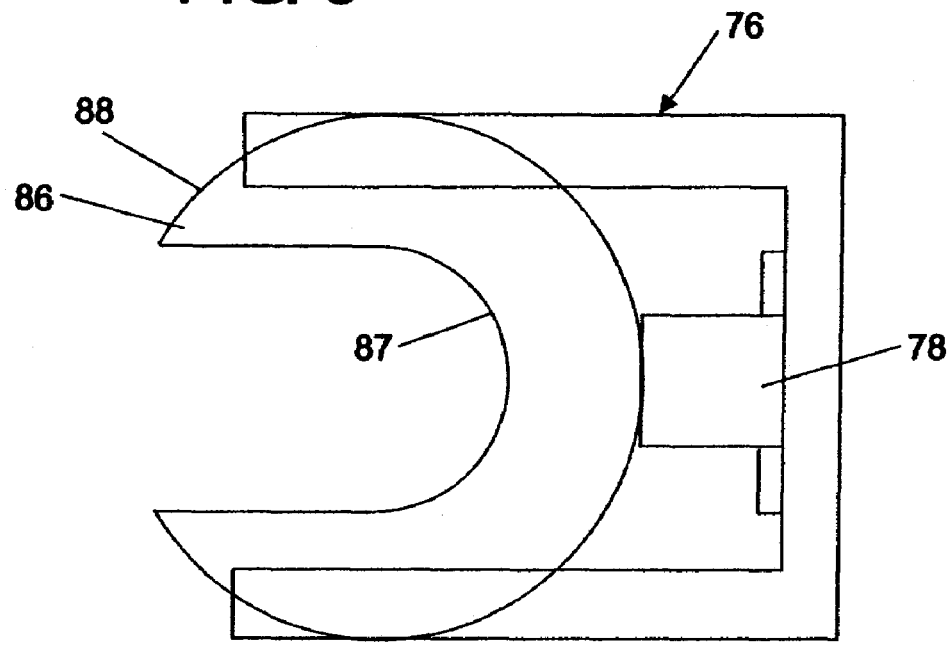
FIG. 5 is a side elevation view of a rotating frame of the material processing device of FIG. 4.

The movable frame 76 is shown individually in the side elevation view of FIG. 5. While the movable frame 76 is shown as being rotatable about the workpiece 80, the movable frame 76 may be adapted to move in other directions relative to the workpiece 80. A drive mechanism 82, discussed in detail below with reference to FIG. 6, may be provided to move the movable frame 76 relative to the workpiece 80. The drive mechanism 82 may comprise at least one drive wheel or gear 84.

The movable frame 76 may include one or more substantially horseshoe shaped members 86. The horseshoe shaped member 86 may have an interior portion 87 that may receive and retain the workpiece 80 and a substantially circular exterior portion 88 to engage the at least one drive wheel or gear 84 of the drive mechanism 82. The at least one drive wheel or gear 84 engages the exterior portion 88 of the horseshoe shaped member 86 at substantially all degrees of rotation of the movable frame 76.

Figure 6:
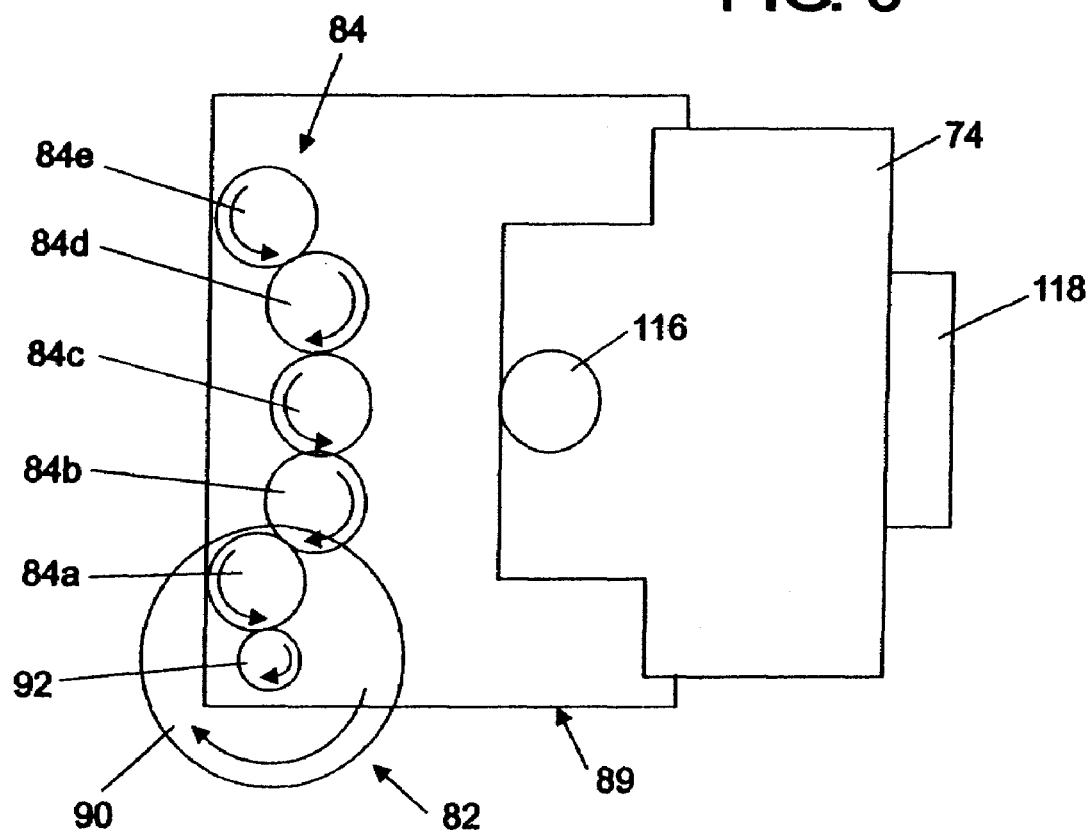
FIG. 6 is a side elevation view of an inspection head of the material processing device of FIG. 4.
Figure 7:
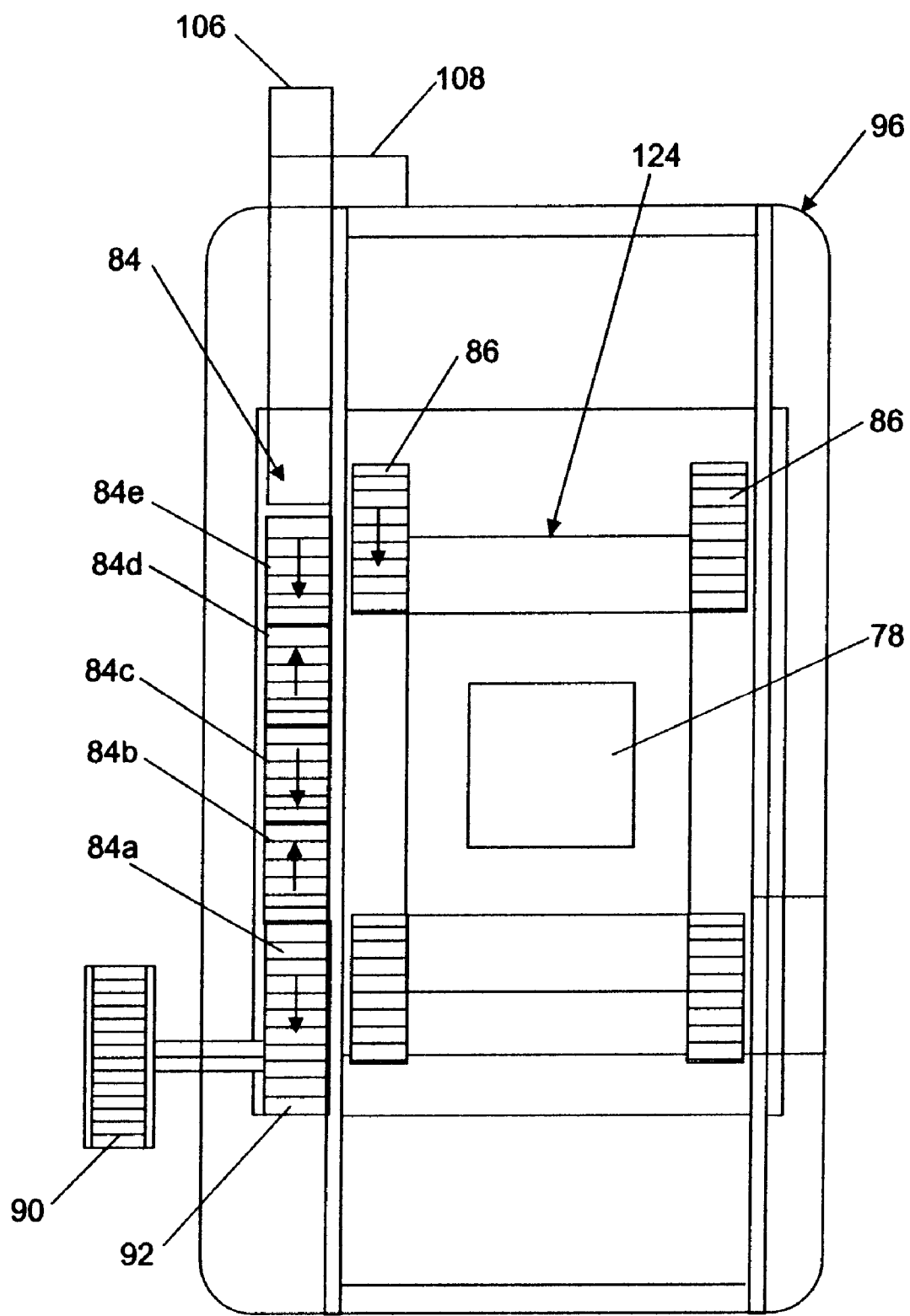
FIG. 7 is a section view of the material processing device of FIG. 4 taken along line 7-7 of FIG. 4.

The at least one drive wheel or gear 84 and the drive mechanism 82 may be mounted to and form part of a material processing head 89. As best seen in FIG. 6, which includes a side elevation view of the material processing head 89, and FIG. 7, a section view of the device 72 taken along lines 7-7 in FIG. 4, the drive mechanism 82 may comprise a controller 90, a spur gear 92, and a plurality of gears 84a-e. The controller 90 may be a vernier dial control, with an indicator (not shown) of the degrees of notation in either direction. The controller 90 may be operatively connected to the plurality of gears 84 to move or rotate the movable frame 76 to direct the energy beam on the at least one predetermined location on an exterior surface of the workpiece 80 or around the workpiece 80. In the embodiment shown, the controller 90 drives the spur gear 92 that may engage a first drive gear 84a. The first drive gear 84a may engage the exterior portion 88 of the horseshoe shaped member 86, which may be a horseshoe gear having teeth on its exterior portion 88. The first drive gear 84a may also engage a first slave gear 84b. The first slave gear 84b does not engage the horseshoe shaped member 86, but may engage a second drive gear 84c. Similarly to the first drive gear 84a, the second drive gear 84c may engage the horseshoe shaped member 86 as well as a second slave gear 84d. The second slave gear 84d does not engage the horseshoe shaped member 86, but may engage a third drive gear 84e. As shown, this arrangement causes the drive gears 84a, 84c, and 84e to turn in the same direction and maintains at least one drive gear 84a, 84c, and 84e in engagement with the horseshoe shaped member 86 for substantially the complete range of movement or substantially all degrees of rotation of the movable frame 76.

The device 72 may also include a housing 96, which may include a first part 98 and a second part 100. The parts 98 and 100 may be coupled together by a hinge arrangement 102 or the like to permit parts 98 and 100 to pivotally move relative to one another to releasably enclose the portion of the workpiece 80 under inspection. The parts 98 and 100 may join, for example, at an overlapping junction 104. A first lever 106 and a second lever 108 may be provided to open the housing 96 to admit and release the workpiece 80 when a force represented by an arrow 110 in FIG. 4 is applied to levers 106 and 108. The levers 106 and 108 may be spring loaded by a biasing mechanism 112 to return the housing 96 to the closed position when force 110 is not applied. The biasing mechanism 112 may be a spring associated with the hinge arrangement 102 to clamp the first and second parts 98 and 100 around the workpiece 80 during a material processing operation. The housing 96 may form a seal around the workpiece 80 to retain the energy beam or laser and any debris during a material processing operation. The material processing head 89 may be mounted to one part of the housing 86 and extend at least partially within the housing 86.

The energy beam source 74 may be operatively connected to the energy beam transfer device 78, and may also be mounted to the material processing head 89. Fiber optic cable 114 may be used to operatively connect the source 74 to the transfer device 78 with the fiber optic cable 114 stored in a reel 116. The reel 116 may allow the cable 114 to extend and retract as required depending on the position of the movable frame 76. In FIG. 6, the material processing head 89 is shown individually with the energy beam source 74 and receptacle 118 or the like to connect electrical power to the energy beam source 74.

The workpiece 80 may include for example, a tube, and may be located on an aerospace vehicle or may be a component on another type vehicle or apparatus. The device 72 may be adapted to operate in substantially a vacuum, in zero gravity, or in other environments.

Figure 8:
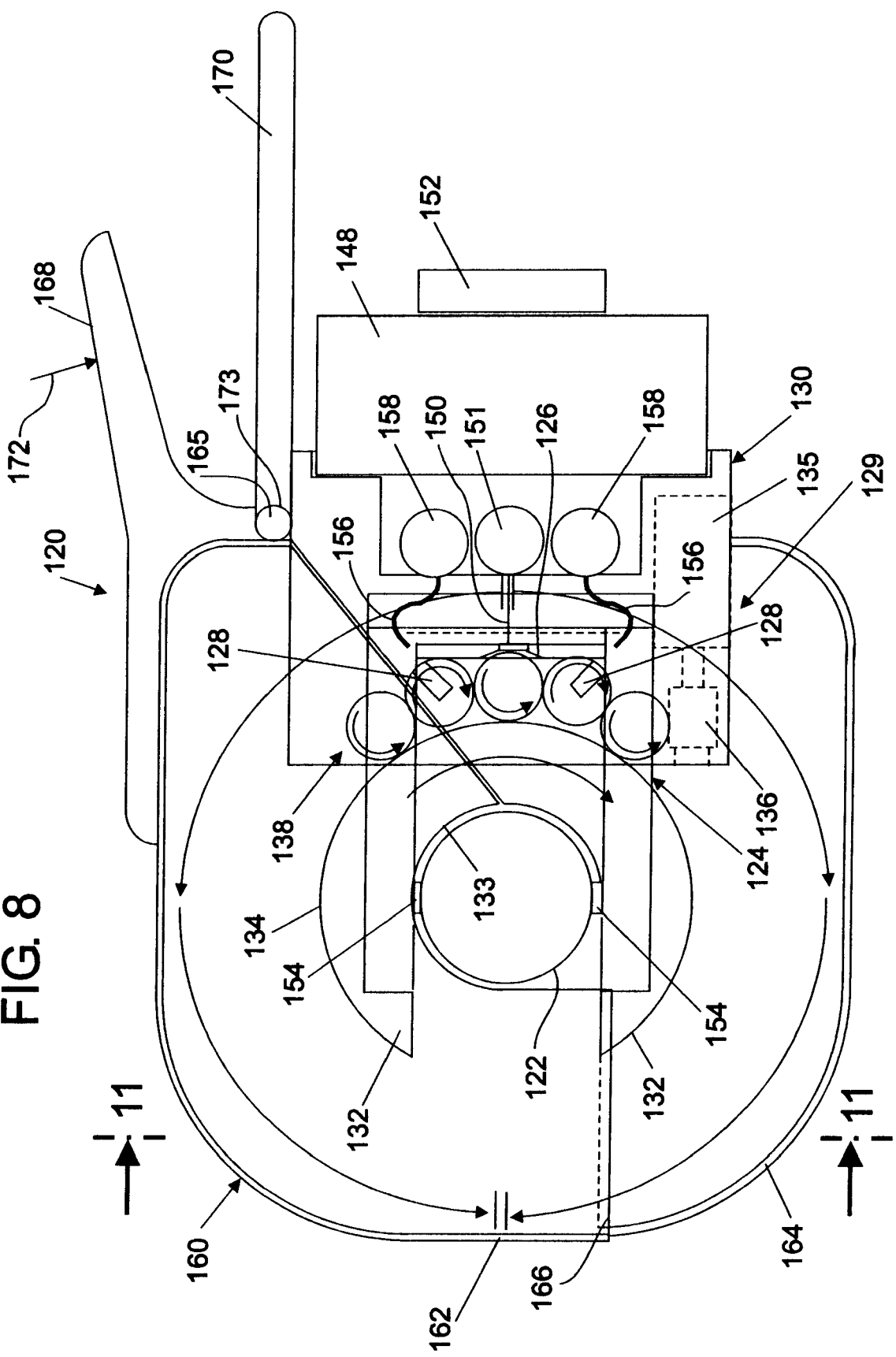
FIG. 8 is a section view of an inspection device in accordance with another embodiment of the present invention.

FIGS. 8-11 show a device 120 for inspecting a workpiece 122 in accordance with another embodiment of the present invention. FIG. 8 is a section view of the device 120 for inspecting the workpiece 122. The inspection device 120 includes a movable frame 124, a laser holographic exciter 126, and at least one laser reader 128. In the illustrated embodiment in FIGS. 8-11 two readers 128 are shown. The exciter 126 and laser readers 128 are mounted to the movable frame 124. The movable frame 124 is shown individually in the side elevation view of FIG. 9. While the movable frame 124 is shown as being rotatable about the workpiece 122, the movable frame 124 may be adapted to move in other directions relative to the workpiece 122. A drive mechanism 129, discussed in detail below with reference to FIG. 10, may be provided to move the movable frame 124 relative to the workpiece 122. The drive mechanism 129 may include at least one drive wheel or gear 138. The at least one drive wheel or gear 138 and the drive mechanism 129 may be mounted to and form part of a laser inspection head 130.

The movable frame 124 may include one or more substantially horseshoe shaped members 132. The horseshoe shaped member 132 may have an interior portion 133 that may receive and retain the workpiece 120 and a substantially circular exterior portion 134 to engage the at least one drive wheel or gear 138 of the drive mechanism 129. The at least one drive wheel or gear 138 engages the exterior portion 134 of the horseshoe shaped member 132 at substantially all degrees of rotation or range of movement of the movable frame 124.

Figure 10:
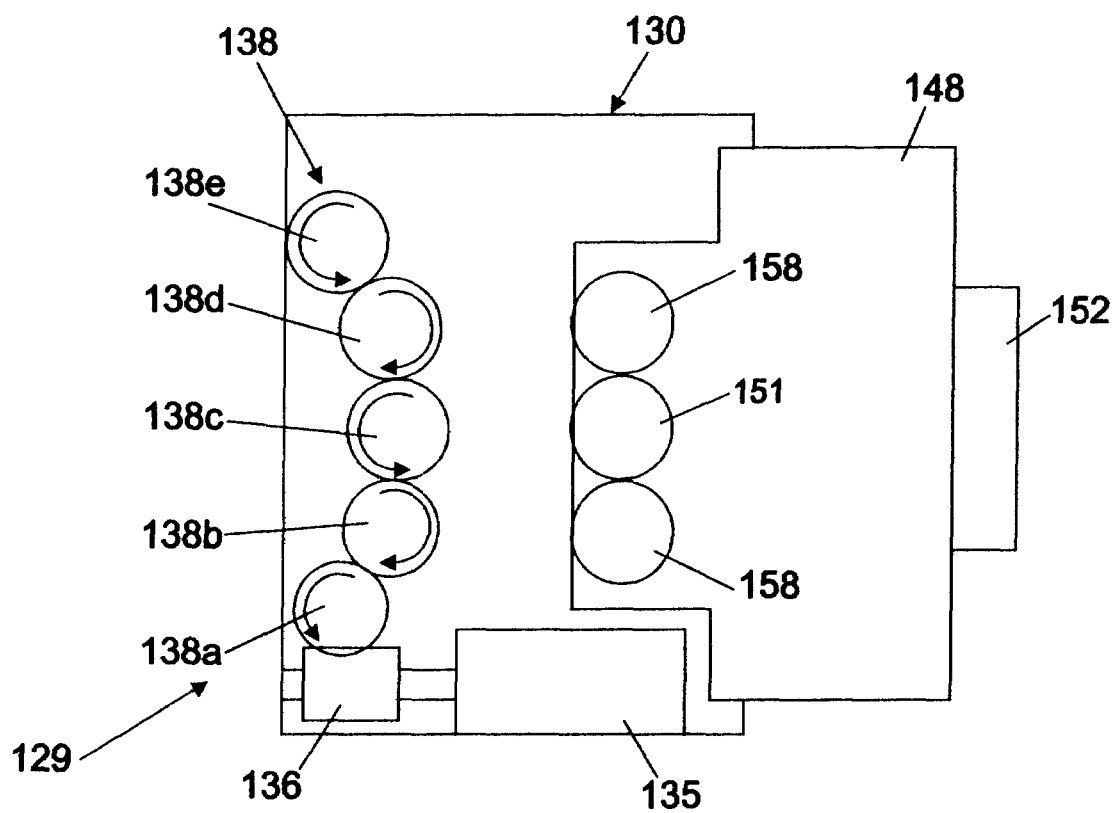
FIG. 10 is a side elevation view of an inspection head of the inspection device of FIG. 8.
Figure 11:
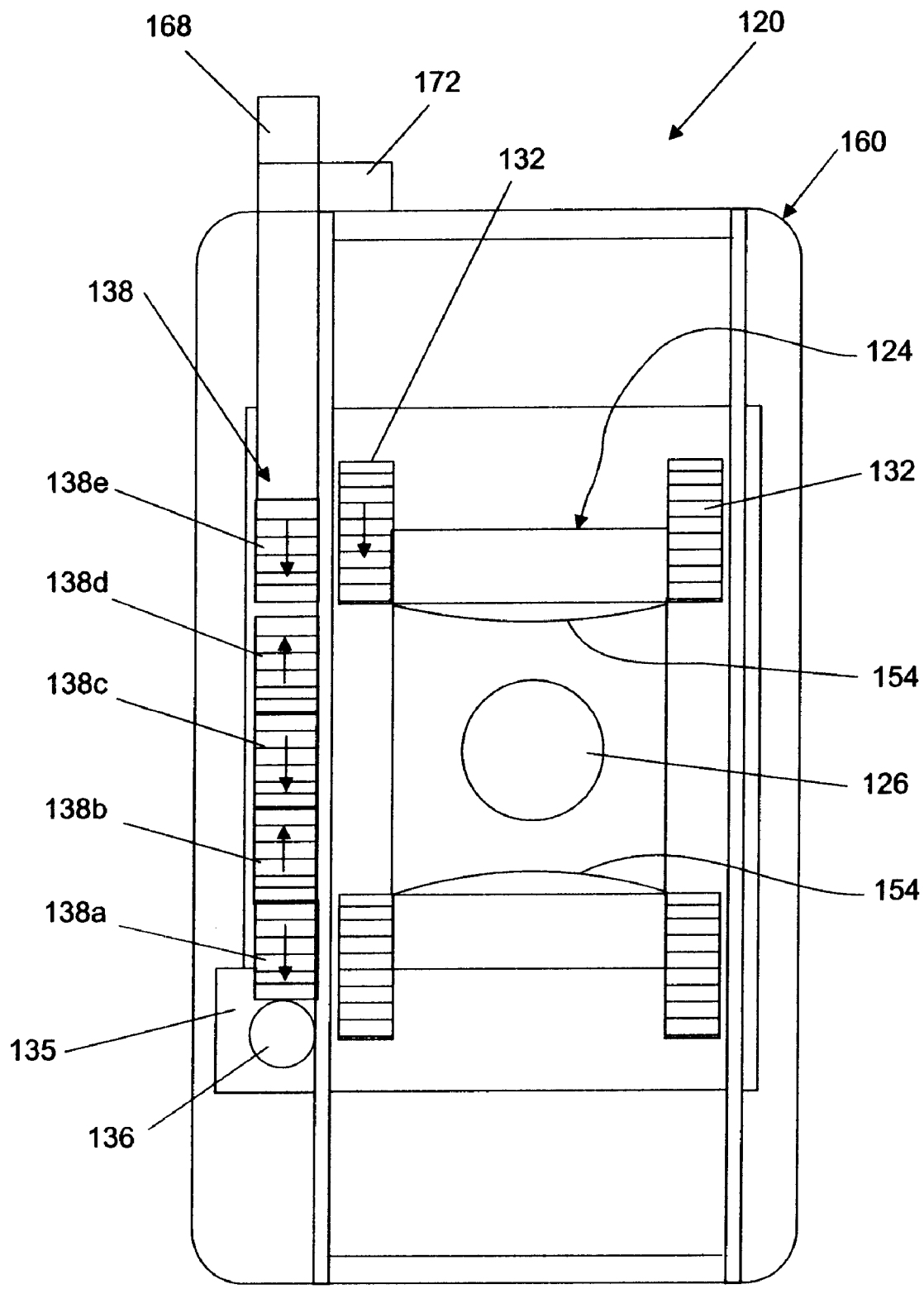
FIG. 11 is a section view of the inspection device of FIG. 8 taken along line 11-11 of FIG. 8.

As best shown in FIG. 10, which includes a side elevation view of the laser inspection head 130, and FIG. 11, a section view of the device 120 taken along lines 11-11 in FIG. 8, the drive mechanism 129 may include a motor 135, a worm gear 136, and a plurality of gears 138*a-e*. The motor 135 drives the worm gear 136 that may engage a first drive gear 138*a*. The first drive gear 138*a* may engage the exterior portion 134 of the horseshoe shaped member 132, which may be a horseshoe gear having teeth on its exterior portion 134. The first drive gear 138*a* may also engage a first slave gear 138*b*. The first slave gear 138*b* does not engage the horseshoe gear 132, but may engage a second drive gear 138*c*. Similarly to the first drive gear 138*a*, the second drive gear 138*c* may engage the horseshoe shaped member 132 as well as a second slave gear 138*d*. The second slave gear 138*d* does not engage the horseshoe shaped member 132, but may engage a third drive gear 138*e*. As shown, this arrangement causes the drive gears 138*a*, 138*c*, and 138*e* to turn in the same direction and maintains at least one drive gear 138*a*, 138*c*, and 139*e* in engagement with the horseshoe shaped member 132 at all degrees of rotation or range of movement of the movable frame 124.

A laser holographic emitter 148 may be operatively connected to the exciter 126, and may also be mounted to the laser inspection head 130. Fiber optic cable 150 (FIG. 8) stored in a reel 151 may be used to operatively connect the emitter 148 to the exciter 126. In FIG. 10, the laser inspection head 130 is shown individually with the laser holographic emitter 148 and a receptacle 152 or the like to connect electrical power to the emitter 148.

Figure 9:
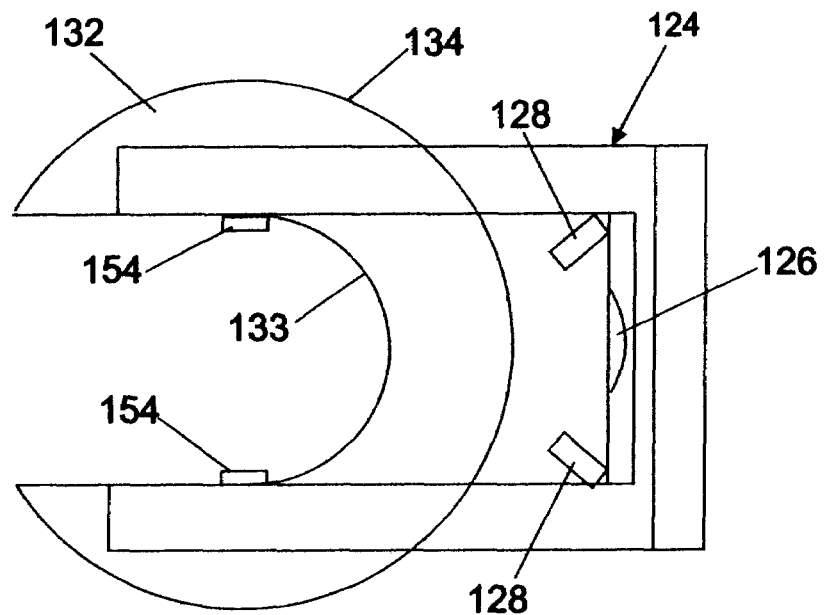
FIG. 9 is a side elevation view of a rotating frame of the inspection device of FIG. 8.

As shown in FIGS. 8 and 9, the movable frame 124 may include one or more workpiece support members 154 adapted to engage and to permit the movable frame 124 to rotate about or move relative to the workpiece 122 during an inspection process. The workpiece support members 154 apply stress to the workpiece 124 by applying a light load needed to establish a standardized holographic pattern corresponding to the workpiece 122 material and wall thickness. As the movable frame 124 rotates or moves, a projected laser holographic pattern may be moved relative to the portion of the workpiece 122 to be inspected. The movable frame 124 in this example embodiment may rotate around the workpiece 122 at least about 180 degrees in each direction to provide substantially complete inspection of the workpiece 122. Defects in the workpiece 122 may be detected by observing changes in the laser holographic pattern using the laser readers 128 as is known.

Detection of defects and observation of the laser holographic pattern may be performed with the at least one laser reader 128. The readers 128, as shown, may be operatively connected to the laser holographic emitter 148 using fiber optic cable 156 stored in reels 158. The reels 158 may allow the cable 156 to extend and retract as required depending on the position of the movable frame 124. Images received by the readers 128 of the laser holographic pattern or the workpiece 122 may be displayed on a monitor (not shown) or the like for an operator to detect any defects.

The device 20 may also include a housing 160, which may include a first part 162 and a second part 164 that may enclose at least the movable frame 124 and a portion of the workpiece 122 under inspection. The parts 162 and 164 may be coupled together by a hinge arrangement 165 or the like to permit parts 162 and 164 to pivotally move relative to one another to releasably enclose the portion of the workpiece 122 under inspection. The parts 162 and 164 may join, for example, at an overlapping junction 166. A first lever 168 and a second lever 170 may be provided to open the housing 160 to admit and release the workpiece 122 when a force represented by arrow 172 in FIG. 8 is applied. The levers 168 and 170 may be spring loaded by a biasing mechanism 173 to return the housing 160 to the closed position when force 172 is not applied. The biasing mechanism 173 may be a spring associated with the hinge arrangement 165 to clamp the first and second parts 162 and 164 around the workpiece 122 during an inspection operation. The housing 160 may form a seal around the workpiece 122 to retain laser light discharged by the exciter 126 during an inspection operation. The laser inspection head 130 may be mounted to one part of the housing 160 and extend at least partially within the housing 160. The workpiece 122 may be, for example, a tube on an aerospace vehicle or workpiece on another vehicle or apparatus.

Figure 12:
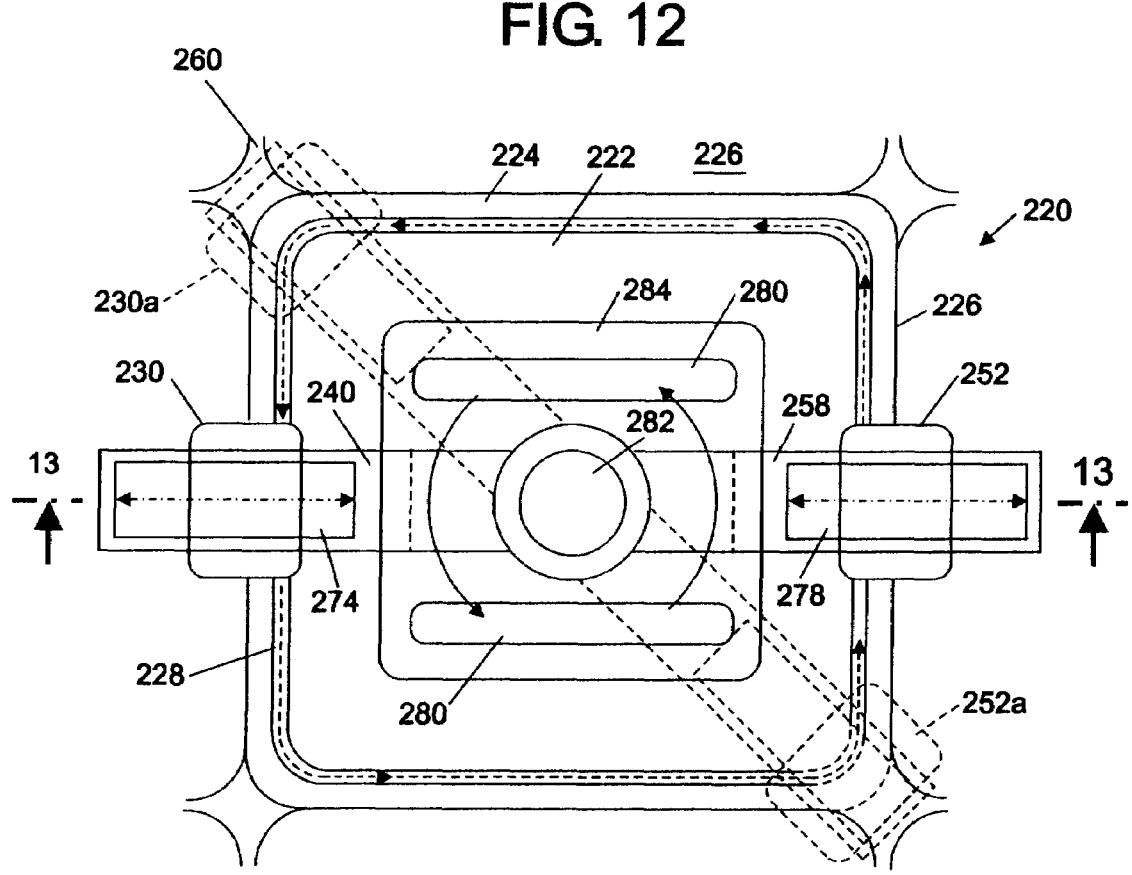
FIG. 12 is a top plan view of a material processing device in accordance with another embodiment of the present invention.
Figure 13:
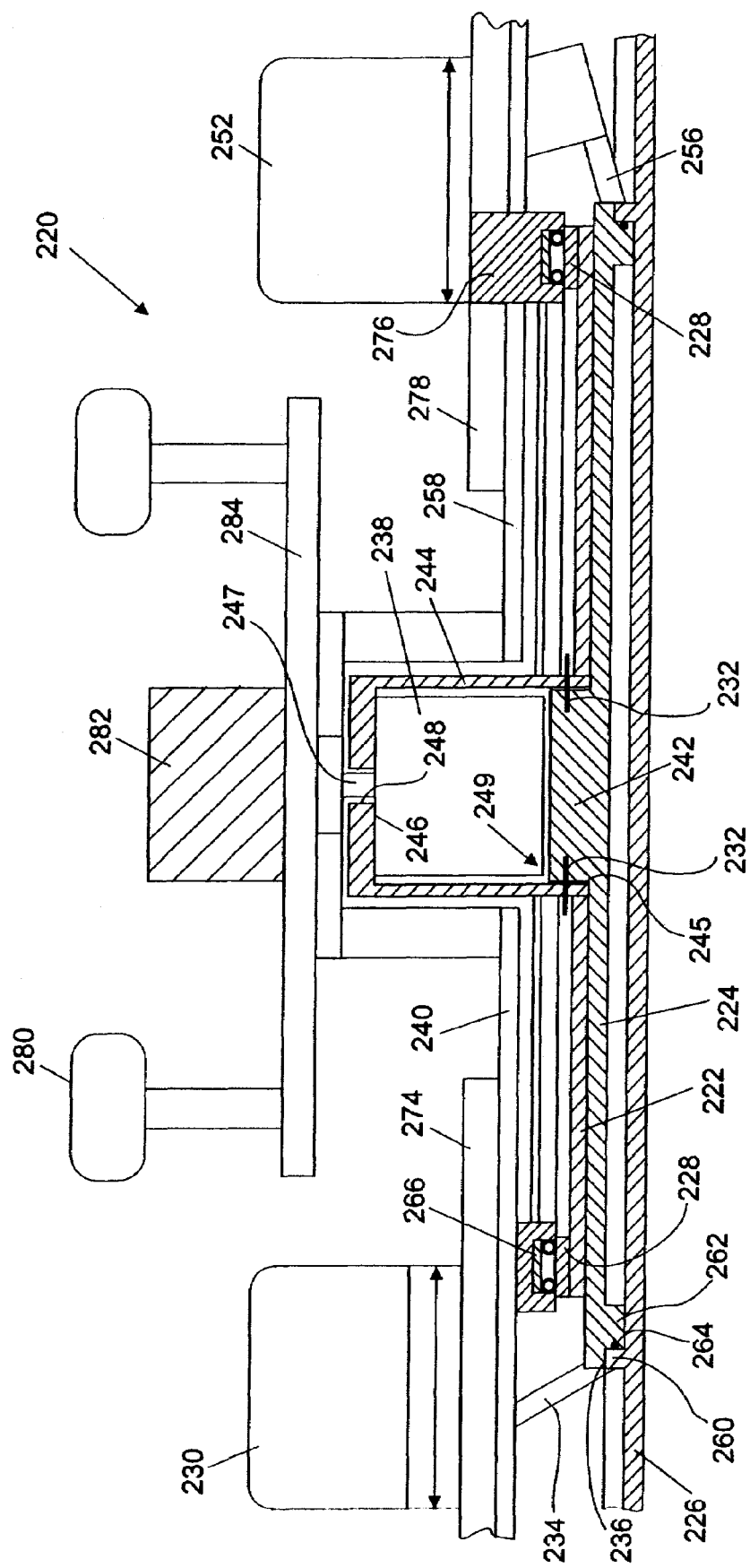
FIG. 13 is a section view of the material processing device of FIG. 12 taken along line 13-13 of FIG. 12.

FIGS. 12 and 13 are respectively top plan and section views of a material processing device 220 in accordance with another embodiment of the present invention. The device 220 includes a base member 222 that may releasably hold a portion of material 224 to be attached to a workpiece 226. The device 220 also includes a track 228 mounted to the base member 222, and a material processing system 230 that may move along the track 228 to perform a material processing operation on the workpiece 226. The track 228 may be continuous around the periphery of the base member 222 as shown, or may differ in layout. The material processing system 230 may be, for example, an electron beam system or a laser material processing system, which direct an electron beam 234 or laser towards a junction 236 formed by the portion of material 224 and the workpiece 226 (FIG. 13).

The device 220 may further include a drive motor 238 and a carriage drive arm 240 that couples the motor 238 to the material processing system 230 to move the material processing system 230 along the track 228. The motor 238 may be housed in a hub 244 (FIG. 13). The hub 244 may be open at one end 245, and substantially closed at an opposite end 246. A shaft 247 of the motor 238 may extend through an axial opening 248 formed in the substantially closed end 246 of the hub 244, where the shaft 247 may then be connected to a carriage drive arm 240 that extends to the material processing system 230.

The device 220 may also include an attachment mechanism 249 to releasably attach the portion of material 224 to base member 222. The attachment mechanism 249 may include a plurality of retractable pins 232 or the like mounted to the hub 244 that may releasably engage a protrusion 242 extending from the portion of material 224.

The device 220 may also include a laser holographic inspection system 252 or the like. The laser holographic inspection system 252 may move along the track 228 to perform an inspection operation on the workpiece 226 by directing a laser holographic pattern 256 on the material processed by the material processing system 230 for inspection. The device 220 may further include a drive motor that may be the same as the drive motor 238 for the material processing system 230. A carriage drive arm 258 may couple the motor 238 to the laser holographic inspection system 252 to move the laser holographic inspection system 252 along the track 228. Although the carriage drive arms 240 and 258 are 180 degrees apart, other angles of separation may be used. Further, the carriage drive arms 240 and 258 may be integrally formed.

As shown in FIG. 12, the modified position of the material processing system 230a and the laser holographic inspection system 252a demonstrates rotation to perform operations at the corners of the portion of material 224 which may be a repair patch. As the material processing system 230 and laser holographic inspection system 252 move along the tract, lateral movement is permitted along the carriage arms 240 and 258, thus allowing operations at the junction 226 around the entire repair patch or portion of material 224.

The track 228 may be formed in any predetermined path according to the shape of the portion of material 224. The workpiece 226 may be a section of ISO grid on an aerospace vehicle, and the portion of material 224 to be attached to the workpiece 226 may be an ISO grid repair patch, although the workpiece 226 and portion of material 224 may be other objects. Where the portion of material 224 is to be attached to a surface of a workpiece 226 that has a periphery with ridges 260, such as an ISO grid or the like as shown in FIG. 13, spacers 262 may be provided on the portion of material 224 for alignment. For further alignment, biased ball plungers 264 or the like may be provided along each edge of the spacers 262 on the surface proximate to ridges 260 of the ISO grid.

Figure 14:
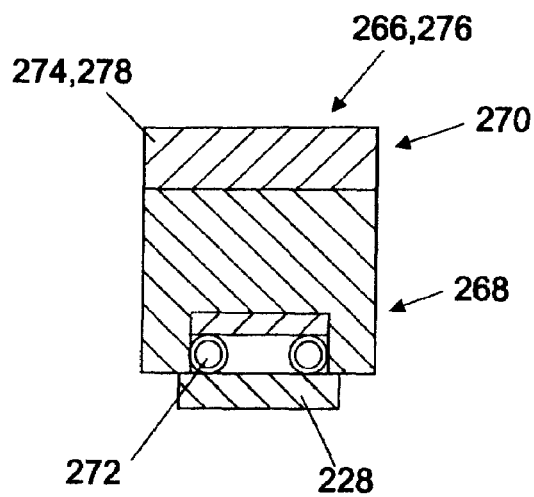
FIG. 14 is a front elevation view of a carriage and tracks for use in the material processing device of FIG. 12.
Figure 15:
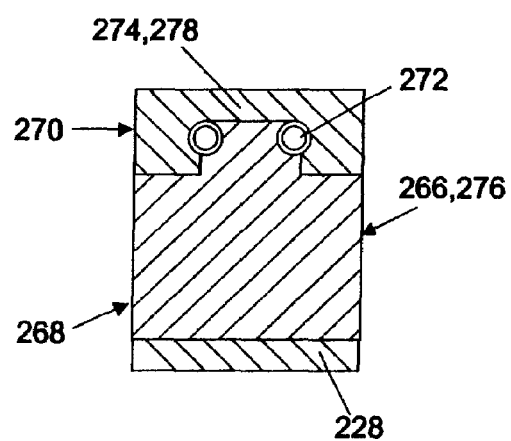
FIG. 15 is a side elevation view of a carriage and tracks for use in the material processing device of FIG. 12.

In another embodiment, the device 220 may further include a first carriage 266. FIGS. 14 and 15 are respectively detailed front and side elevations of the first carriage 266 including a bottom portion 268 and a top portion 270. The carriage 266 may include balls 272 at top and bottom ends 268 and 270 on which the carriage 266 rides, which may be, for example, polytetrafluoroethylene coated titanium balls or the like. As shown in FIG. 14, the bottom portion 268 of the carriage 266 rides on the track 228. As shown in FIG. 15, the top portion 270 of the carriage 266 is configured to accept a second track 274 mounted to the carriage drive arm 240 and oriented at substantially a 90 degree angle relative to the first track 228 (FIG. 13). The second track 274 is slidably mounted to the top portion 270 of the carriage 266 to permit the material processing system 230 to move laterally relative to the first track 228.

A laser holographic inspection system 252 may move along the first track 228 as previously described. The device 220 may also include a second carriage 276 similar to the first carriage 266, where the bottom portion 268 of the second carriage 276 rides on the first track 228. The top portion 270 of the second carriage 276 is configured to accept a third track 278 oriented at substantially a 90 degree angle relative to the first track 228. The third track 278 is slidably mounted to the top portion 270 of the second carriage 276 to permit the laser holographic inspection system 252 to move laterally relative to the first track 228.

Hand grips 280 and a robotic interface 282, may be mounted to a plate 284 to apply and retract the device 220. The plate 284 may be mounted to the shaft 247 of the motor 238, the carriage drive arms 240 and 258, or both. The plate 284 may rotate as the shaft 247 rotates. The hand grips 280 and robotic interface 282 may facilitate use of the device 220 in aerospace applications, such as performing ISO grid repairs and inspections in outer space on the ISS or repairs and inspections on other space vehicles.

Specific embodiments of an invention are described herein. One of ordinary skill in the welding, cutting, joining, and non-destructive inspection arts will recognize that the invention has other applications in other environments. In fact, many embodiments and implementations are possible. For example, the material processing device of the present invention may be used in extraterrestrial applications, as well as terrestrial ones such as mass production of axles, radiators, gears, and automatic transmission parts for the automotive industry, and industrial heat exchangers, turbine construction, vacuum electronics, and tube sheets in the power generation industry to name a few examples. The laser holographic inspection device may be applied in any industry that requires continuous stress area monitoring, such as monitoring of high pressure drilling processes in the petrochemical industry. This application is intended to cover any adaptations or variations of the present invention. The following claims are in no way intended to limit the scope of the invention to the specific embodiments described.

The invention claimed is:

1. A device to process material, comprising:
an energy beam source to generate an energy beam;
a plurality of energy beam transfer devices operatively connectable to the energy beam source and disposable relative to a single workpiece to be processed, to direct the energy beam in a predetermined pattern on an exterior surface of the workpiece; and
a housing to enclose the energy beam transfer devices and at least a portion of the workpiece to be processed, wherein the housing includes:
a first part; and
a second part, wherein the first part and the second part are pivotably coupled for movement relative to one another to releasably enclose at least the portion of the workpiece to be processed, and wherein the plurality of energy beam transfer devices are fixedly mounted to the housing and are stationary during processing of the workpiece.

2. The device of claim 1, wherein the energy beam source comprises one of an electron beam system or a laser material processing system.

3. The device of claim 1, wherein the energy beam transfer device comprises a lens.

4. The device of claim 1, further comprising
a switching device to apply the energy beam to each energy beam transfer device to direct the energy beam.

5. The device of claim 1, wherein each energy beam transfer device is angled to allow the energy beam from each energy beam transfer device to overlap with the energy beam from adjacent energy beam transfer devices on the workpiece to substantially completely cover around the exterior surface of the workpiece.

6. The device of claim 1, further comprising:
a first transfer device support coupled to an interior of the first part of the housing to support a first group of the plurality of energy beam transfer devices; and
a second transfer device support coupled to an interior of the second part of the housing to support a second group of the plurality of energy beam transfer devices.

7. The device of claim 1, further comprising a workpiece fixture to retain the workpiece in position relative to each of the plurality of transfer devices during a material processing operation.

8. The device of claim 7, wherein the workpiece fixture comprises a plurality of centering pins to hold the workpiece in position.

9. The device of claim 8, wherein the workpiece fixture further comprises:
a first pin support coupled to an interior of the first part of the housing to support a first group of pins of the plurality of centering pins; and
a second pin support coupled to an interior of the second part of the housing to support a second group of pins of the plurality of centering pins.

10. The device of claim 1, wherein the housing is adapted to form a seal around the workpiece to retain the energy beam and any debris within the housing during a material processing operation.

11. The device of claim 1, further comprising a tool positioner including:
a first operating lever; and
a second operating lever pivotally coupled to the first operating lever to hold the housing in position on the workpiece during a material processing operation.

12. The device of claim 4, further comprising a fiber optic cable to operatively connect each of the energy beam transfer devices to the energy beam source.

13. The device of claim 1, wherein the device is adapted to operate in substantially a vacuum and substantially a zero gravity environment.

14. The device of claim 1, wherein the workpiece comprises a component on an aerospace vehicle.

15. The device of claim 1, wherein the predetermined pattern is substantially completely around the exterior surface of the workpiece.

16. A device to process material, comprising:
an energy beam source to generate an energy beam;
a plurality of energy beam transfer devices operatively connectable to the energy beam source and disposable relative to a single workpiece to be processed, to direct the energy beam in a predetermined pattern on an exterior surface of the workpiece; and
a housing to enclose the energy beam transfer devices and at least a portion of the workpiece to be processed, wherein the housing includes:
a first part; and
a second part, wherein the first part and the second part are pivotably coupled for movement relative to one another to releasably enclose at least the portion of the workpiece to be processed and wherein the energy beam source is attached to the second part; and
a lever attached to the first part of the housing and extending from the housing adjacent to the energy beam source, wherein the lever is movable toward and away from the energy beam source to open and close the first and second parts of the housing to releasably enclose at least the portion of the workpiece to be processed.

17. The device of claim 16, further comprising:
a first transfer device support coupled to an interior of the first part of the housing to support a first group of the plurality of energy beam transfer devices, wherein the first group of the plurality of energy beam transfer device are stationary during processing of the workpiece; and
a second transfer device support coupled to an interior of the second part of the housing to support a second group of the plurality of energy beam transfer devices, wherein the second group of the plurality of energy beam transfer device are stationary during processing of the workpiece.

18. A device to process material, comprising:
an energy beam source to generate an energy beam;
a plurality of energy beam transfer devices operatively connectable to the energy beam source and disposable relative to a single workpiece to be processed, to direct the energy beam in a predetermined pattern on an exterior surface of the workpiece; and
a housing to enclose the energy beam transfer devices and at least a portion of the workpiece to be processed, wherein the housing includes:
a first part; and
a second part, wherein the first part and the second part are pivotably coupled for movement relative to one another to releasably enclose at least the portion of the workpiece to be processed;
a first transfer device support coupled to an interior of the first part of the housing to support a first group of the plurality of energy beam transfer devices, wherein the first transfer device and the first group of the plurality of energy beam transfer devices are stationary during processing of the workpiece; and
a second transfer device support coupled to an interior of the second part of the housing to support a second group of the plurality of energy beam transfer devices, wherein the second transfer device and the second group of the plurality of energy beam transfer devices are stationary during processing of the workpiece.

* * * * *